(12) United States Patent
Mutheevi (10) Patent No.: US 12,363,570 B2
(45) Date of Patent: Jul. 15, 2025

(54) CHECKING PERFORMANCE RELATED TO DISTRIBUTED UNITS (DU) AND RADIO UNITS (RU) IN A 5th GENERATION (5G) NETWORK

(71) Applicant: DISH Wireless L.L.C., Englewood, CO (US)

(72) Inventor: Neelima Mutheevi, Littleton, CO (US)

(73) Assignee: DISH Wireless L.L.C., Englewood, CO (US)

( * ) Notice: Subject to any disclaimer, the term of this patent is extended or adjusted under 35 U.S.C. 154(b) by 469 days.

(21) Appl. No.: 18/046,197

(22) Filed: Oct. 13, 2022

(65) Prior Publication Data

US 2024/0129764 A1   Apr. 18, 2024

(51) Int. Cl.
  *H04W 24/08* (2009.01)
  *G06F 16/11* (2019.01)
  *H04L 43/04* (2022.01)

(52) U.S. Cl.
  CPC .......... *H04W 24/08* (2013.01); *G06F 16/119* (2019.01); *H04L 43/04* (2013.01)

(58) Field of Classification Search
  CPC ................................................... H04W 24/08
  See application file for complete search history.

(56) References Cited

U.S. PATENT DOCUMENTS

| | | | |
|---|---|---|---|
| 6,470,349 B1 * | 10/2002 | Heninger | G06F 16/972 |
| | | | 707/999.102 |
| 12,074,761 B1 * | 8/2024 | Rajendran | H04W 76/19 |
| 12,213,014 B1 * | 1/2025 | Dural | H04W 36/087 |
| 12,236,248 B1 * | 2/2025 | Gupta | G06F 9/445 |
| 2015/0378864 A1 * | 12/2015 | Lensmar | G06F 9/45508 |
| | | | 717/130 |
| 2025/0039702 A1 * | 1/2025 | Baker | H04W 24/04 |
| 2025/0056267 A1 * | 2/2025 | Agcaoili | H04L 43/55 |

FOREIGN PATENT DOCUMENTS

EP          4503707 A1 *  2/2025  ............ H04W 24/02

\* cited by examiner

*Primary Examiner* — Abdeltif Ajid
(74) *Attorney, Agent, or Firm* — Baker Botts L.L.P.

(57) ABSTRACT

A jump server receives a command to check performance of one or more Distributed Units (DUs) or one or more Radio Units (RUs) at one or more cell sites. In response, the jump server executes a wrapper script that logs into a performance server, copies at least one input file that identifies the one or more DUs or the one or more RUs and a performance script to a user-specific directory at the performance server and initiates execution of the performance script at the performance server. The execution of the performance script causes the performance server to run a set of performance checking procedures on the one or more DUs or the one or more RUs identified in the input file, generate an output log file that comprises results of running the set of performance procedures, and store the output log file in the user specific directory.

20 Claims, 5 Drawing Sheets

| SITE-NAME | RU-IP |
|---|---|
| SDLAS00001D | 10.154.164.73 |
| SDLAS00001D | 10.154.164.74 |
| SDLAS00001D | 10.154.164.74 |
| SDLAS00001D | 10.154.164.75 |
| SDLAS00001D | 10.154.164.76 |
| SDLAS00001D | 10.154.164.76 |
| SDLAS00001D | 10.154.164.77 |
| SDLAS00001D | 10.154.164.78 |
| SDLAS00001D | 10.154.164.78 |

| A | B |
|---|---|
| OPTION | SELECTED |
| ACTIVE ALARMS | YES |
| PTP LOCK | YES |
| CALL HOME | YES |
| RU VERSION | YES |
| PACKET ANALYSIS | YES |
| POWER | YES |

| CLUSTER NAME | CLUSTER IP | SITEID/DU ID |
|---|---|---|
| cyswy002r-mvnr-p015 | 10.133.152.136 | sdlas00125c |
| cyswy002r-mvnr-p015 | 10.133.152.136 | sdlas00123b |
| cyswy002r-mvnr-p015 | 10.133.152.136 | 851010009 |
| cyswy002r-mvnr-p014 | 10.133.155.117 | sdlas00230a |
| cyswy002r-mvnr-p015 | 10.133.152.136 | 851013009 |
| cyswy002r-mvnr-p015 | 10.133.152.136 | sdlas00020b |
| cyswy002r-mvnr-p016 | 10.133.155.102 | sdlas00041b |
| cyswy002r-mvnr-p015 | 10.133.152.136 | sdlas00112b |
| cyswy002r-mvnr-p014 | 10.133.155.117 | sdlas00015b |
| cyswy002r-mvnr-p014 | 10.133.155.117 | sdlas00084b |
| cyswy002r-mvnr-p018 | 10.133.155.128 | nabna00045a |

CHECKING PERFORMANCE RELATED TO DISTRIBUTED UNITS (DU) AND RADIO UNITS (RU) IN A 5th GENERATION (5G) NETWORK

TECHNICAL FIELD

The present disclosure relates generally to wireless communications, and more specifically to checking performance related to Distributed Units (DUs) and Radio Units (RUs) in a 5$^{th}$ Generation (5G) network.

BACKGROUND

A 5G base station or gNB is mainly split into three parts namely Radio Unit (RU), Distributed Unit (DU) and Control Unit (CU). RU is the radio hardware entity that converts radio signals sent to and from the antenna into digital signal for transmission over a packet network. The RU handles the digital front end (DFE) and the lower physical (PHY) layer. DU is a software entity that is deployed on site on a server. DU software is normally deployed close to the RU on site and provides support for the lower layers of the protocol stack such as the radio link control (RLC), medium access control (MAC), and parts of the PHY layer. The CU provides support for the higher layers of the protocol stack such as the service data adaptation protocol (SDAP), packet data convergence protocol (PDCP) and radio resource control (RRC). Regular health checks need to be performed at a cell site to check performance of the DUs and RUs associated with the cell site.

SUMMARY

The system and methods implemented by the system as disclosed in the present disclosure provide intelligent and quick performance checks at one or more cell sites. The disclosed system and methods provide several practical applications and technical advantages. For example, the disclosed system provides the practical application of providing intelligent and quick performance checks at a plurality of Radio Units (RUs) and/or a plurality of Distributed Units (DUs) operating at one or more cell sites simultaneously. As described in accordance with embodiments of the present disclosure a jump server may use a wrapper script to simultaneously run a set of performance checking procedures on one or more RUs and/or one or more DUs identified in an input file. For example, a plurality of RUs and/or DUs may be identified in one or more input files. The wrapper script may run the performance checking procedures (e.g., one or more performance scripts) on the plurality or RUs and/or DUs identified in the one or more input files. In one example, performance checking procedures may be simultaneously performed on a DU and multiple RUs operating at a cell site. Running performance check procedures on a plurality of RUs and/or DUs in a 5G network quickly and simultaneously helps track performance of the 5G network and resolve any performance related issues in a timely manner. By quickly detecting and resolving the performance related issues based on the performance checks, the disclosed system and methods improve the performance of the 5G network and generally improve the 5G New Radio (NR) technology.

The disclosed system and methods provide an additional practical application of improving performance of computing devices (e.g., servers) that run the performance checks on the RUs and DUs. As described in accordance with embodiments of the present disclosure, once the execution of the performance script copy is completed by the performance server and the output log file has been generated and stored in the user-specific directory, the wrapper script running at the jump server takes over and copies the output log file to the jump server. After copying the output log file to the jump server, the wrapper script deletes the input files, performance script copy and output log file from the user-specific directory at the performance server. Deleting files related to the performance check after the performance check is completed, clears up memory space at the performance server. Further, once the output log file has been copied to the jump server, the wrapper script may copy the output log file from the jump server to the user device of the user. Thereafter, the jump server may delete the input files and wrapper script from the jump server. This helps clean up memory space on the jump server for use by other operations performed by the jump server. Clearing up memory space at the performance server and the jump server improves performance of these servers and saves memory.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
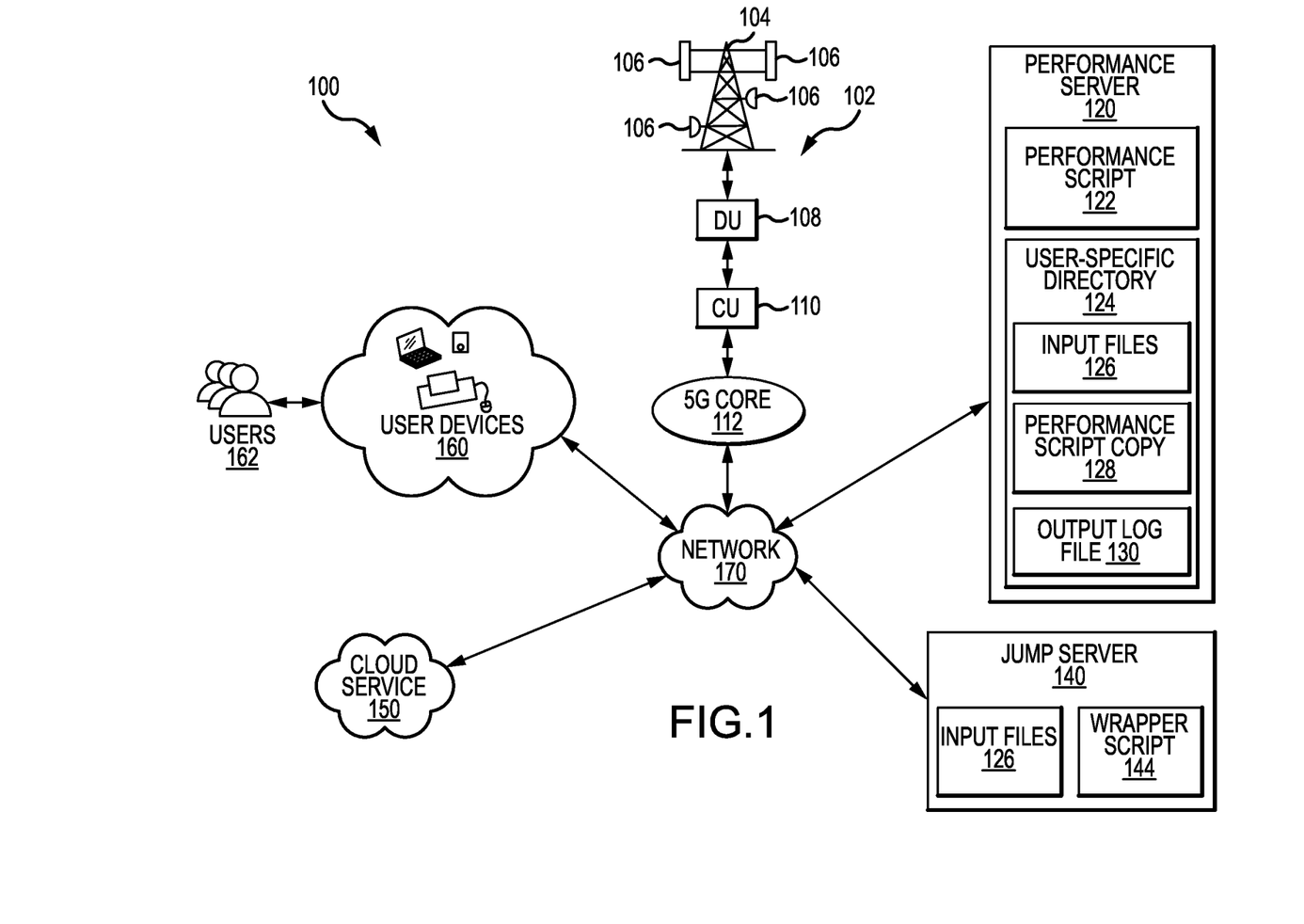
FIG. 1 illustrates an example of a cellular communication system 100, in accordance with embodiments of the present disclosure.

FIG. 1 illustrates an example of a cellular communication system 100, in accordance with embodiments of the present disclosure. As shown in FIG. 1, cellular communication system 100 may include cell site 102, a performance server 120, a jump server 140, a cloud service 150 and user devices 160, each connected to a network 170. The cell site 102 may be part of a 5G base station (also referred to as gNB) and may include a base station tower 104 having one or more radio antennas 106 mounted thereon. In 5G terminology, the radio antennas 106 may be referred to as radio units (RU). It may be noted that the terms "radio antennas 106" and "RUs 106" are used interchangeably in this disclosure. In 5G NR, RU generally refers to a radio hardware entity that converts radio signals sent to and from the antenna into digital signals for transmission over a packet network. The RU handles the digital front end (DFE) and the lower physical (PHY) layer. The cell site 102 may further include a distributed unit (DU) 108 communicatively coupled to the RUs 106. The DU 108 is generally a software entity that is deployed at the cell site 102 on a server and provides support for the lower layers of the protocol stack such as the radio link control (RLC), medium access control (MAC), and parts of the PHY layer. The DU 108 is further connected to a CU 110. The CU 110 may also be a software entity deployed on a server and provides support for the higher layers of the protocol stack such as the service data adaptation protocol (SDAP), packet data convergence protocol (PDCP) and radio resource control (RRC). The CU 110 connects to a 5G core 112 which provides access to the network 170. It may be noted that while system 100 illustrates one cell site 102, one DU 108 and one CU 110, system 100 may include a plurality of cell sites 102, a plurality of DUs 108 and a plurality of CUs 110. Each gNB may include one CU 110, but one CU 110 may control multiple DUs 108. Further, each DU 108 may support a plurality of cell sites 102. In one embodiment, a cell site 102 may include 6 RUs 106 controlled by one DU 108.

The network 170, in general, may be a wide area network (WAN), a personal area network (PAN), a cellular network, or any other technology that allows devices to communicate electronically with other devices. In one or more embodiments, the network 170 may be the Internet. Each user device 160 may be operated by one or more users 162. Each user device 160 may be a computing device (e.g., desktop computer, laptop computer, tablet computer, smart phone etc.) that can be operated by a user 162 and communicate with other devices connected to the network 170.

In one or more embodiments, each of the performance server 120, jump server 140, RU 106, DU 108, CU 110 and user devices 160 may be implemented by a computing device running one or more software applications. For example, one or more of performance server 120, jump server 140, RU 106, DU 108, CU 110 and user devices 160 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the performance server 120, jump server 140, RU 106, DU 108, CU 110 and user devices 160 may be representative of a server running one or more software applications to implement respective functionality as described below. In certain embodiments, one or more of the performance server 120, jump server 140, RU 106, DU 108, CU 110 and user devices 160 may run a thin client software application where the processing is directed by the thin client but largely performed by a central entity such as a server (not shown).

Performance server 120 and jump server 140 may be part of a computing infrastructure of an organization. In this context, the network 170 may include a private network (e.g., local area network (LAN), wide area network (WAN) etc.) to which computing nodes of the organization may be connected. The private network of the organization may be connected to the internet, which also may be part of the network 170. The jump server 140 may provide to users 162 of the organization access to several components (e.g., performance server 120, other servers, printers, etc.) of the computing infrastructure that perform several different functions. In other words, the jump server 140 may act as a portal that provides users 162 access to all other systems and services of the organization's computing infrastructure. Performance server 120 may be configured to check and determine performance of entities in the 5G infrastructure including RUs 106 and DUs 108. For example, the performance server 120 may be communicatively coupled (e.g., via network 170 or directly) to a plurality of cell sites 102 and may be configured to run performance check procedures on several entities at one or more cell sites 102 including one or more RUs 106 and one or more DUs 108. In one embodiment, users 162 may use their user devices 160 to login to the jump server 140. Once logged into the jump server 140, a user 162 may access other systems and services (e.g., performance server 120) of the organization's computing infrastructure.

Regular performance checks need to be performed at cell sites 102 to check performance of the DUs 108 and RUs 106 associated with the cell sites 102 and to determine whether the cell sites 102 are operating in accordance with specified performance parameters. Generally, several such performance checks may need to be performed at a cell site 102 in a single day so that performance issues may be promptly detected and resolved.

Embodiments of the present disclosure discuss techniques for intelligently performing performance checks on RUs 106 and DUs 108 associated with one or more cell sites 102.

Figure 2A:
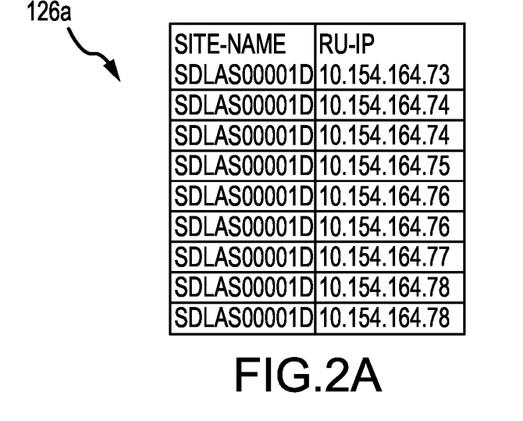
FIG. 2A illustrates an input file for checking performance of RUs, in accordance with embodiments of the present disclosure.
Figure 2B:
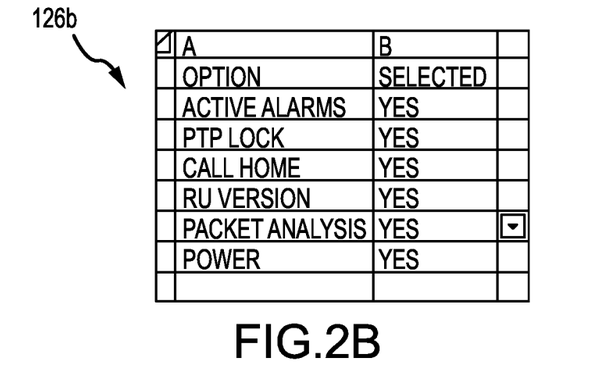
FIG. 2B illustrates an input file in the form of an options table that provides a plurality of selectable options of performance parameters, in accordance with embodiments of the present disclosure.
Figure 2C:
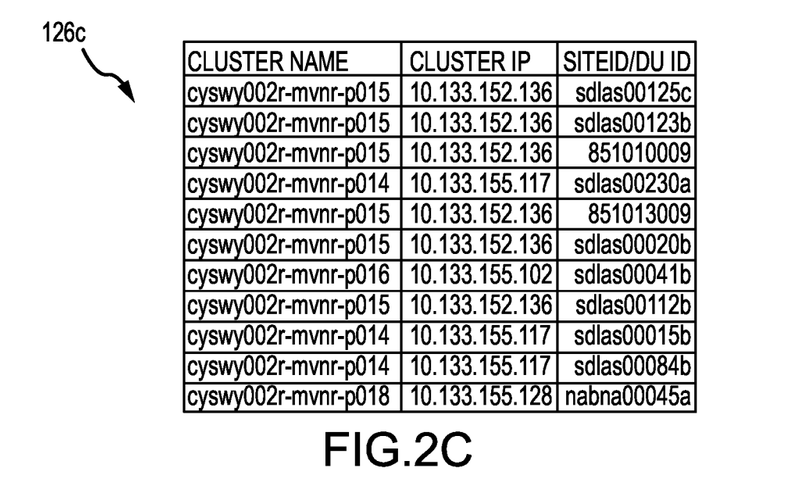
FIG. 2C illustrates an input file for checking performance of DUs, in accordance with embodiments of the present disclosure.

A user 162 desiring to check performance of one or more RUs 106 and/or one or more DUs 108 may provide one or more input files 126 to specify which RUs 106 and/or DUs 108 are to be checked for performance and what performance parameters are to be checked in relation to those RUs 106 and DUs 108. For example, when the user 162 desires to check performance of one or more RUs 106, an input file 126 may specify an identity of each RU 106 that is to be checked and, for each RU 106, an identity of the cell site 102 where the RU 106 is installed. FIG. 2A illustrates an input file 126*a* in the form of a table. As shown in FIG. 2A, each row of the table includes a name of a cell site 102 (shown as Site-Name) and an IP address of an RU 106 (shown as RU-IP) installed at the cell site 102. FIG. 2B illustrates another input file 126*b* in the form of an options table that provides a plurality of selectable options of performance parameters. The user 162 may select one or more parameter options from the table to check the corresponding performance parameter for each RU 106 identified in the input file 126*a* shown in FIG. 2A. It may be noted that input file 126*b* shows a non-exhaustive list of selectable options of performance parameters. Similarly, when the user 162 desires to check performance of one or more DUs 108, an input file 126 may specify an identity of each DU 108 that is to be checked and, for each DU 108, an identity of the server that implements the DU 108. It may be noted that a server may implement multiple DUs 108 and may be called a cluster. FIG. 2C illustrates an input file 126*c* in the form of a table. As shown in FIG. 2C, each row of the table identifies a DU 108 (shown as Site ID/DU ID), a cluster name of the server that implements the DU 108 and an IP address of the cluster/server (shown as Cluster IP). It may be noted that since each cell site 102 generally has a single DU 108, the Site ID associated with a cell site 102 may identify the DU 108 operating that the cell site 102.

A wrapper script 144 may be provided to run performance checks on requested RUs 106 and/or DUs 108. The wrapper script 144 is a software program that automatically performs a number of tasks further described below to perform performance checks on RUs 106 and/or DUs 108 identified in the input files 126. The wrapper script 144 and input files 126 may initially be stored at a user device 160 of the user 162 desiring to run performance checks on one or more RUs and/or DUs. For example, the user 162 may generate the input files 126 (e.g., as shown in FIGS. 2A and 2C) using user device 160 by entering information identifying the RUs 106 and/or DUs 108 the user 162 desires to check for performance. The user 162 may also generate using the user device 160 one or more input files 126 (e.g., as shown in FIG. 2B) specifying one or more performance parameters that are to be checked in relation to one or more RUs and/or DUs. In one embodiment, once generated, the user 162 may upload the input files 126 to a cloud service 150. Additionally or alternatively, the wrapper script 144 may also be stored at the cloud service 150. In this context, when the user 162 is ready to run performance check on one or more RUs and/or DUs, the user 162 may download the input files 126 and the wrapper script 144 from the cloud service 150 on to the user device 160 of the user 162.

As part of running performance checks on RUs and/or DUs, the user 162 may first login to the jump server 140. As described above, the jump server 140 may act as a portal that provides users 162 access to all other systems and services of an organization's computing infrastructure. In one embodiment, the user 162 may need authentication credentials to login to the jump server 140. For example, the jump server 140 may require multi-factor authentication for logins to the jump server 140. Once logged into the jump server 140, the user 162 may copy the input files 126 and the wrapper script 144 to the jump server 140. Once the input files 126 and wrapper script 144 are stored at the jump server 140, the jump server 140 may be configured to initiate the performance check of RUs and/or DUs identified in the input files 126 by executing the wrapper script 144. In one embodiment, after the input files 126 and wrapper script 144 are stored at the jump server 140, the jump server 140 may receive a command (e.g., from the user 162) to perform performance check in relation to one or more RUs and/or one or more DUs identified in the input files. The jump server 140 may execute the wrapper script 144 in response to receiving the command.

Execution of the wrapper script 144 may cause the jump server 140 to perform a number of tasks in relation to checking performance of the RUs and/or DUs identified in the input files 126. The wrapper script 144 causes the jump server 140 to log into the performance server 120. As described above, performance server 120 may be configured to check and determine performance of entities in the 5G infrastructure including RUs 106 and DUs 108. In one embodiment, the wrapper script 144 may use authentication credentials of the user 162 requesting the performance check to login to the performance server 120. For example, only certain users 162 of the organization may be authorized to access the performance server 120 and run performance routines on the RUs 106 and/or DUs 108. The wrapper script 144 may check user authorization of the user 162 requesting the performance check and login to the performance server 120 if the user is authorized to run the requested performance check. In one embodiment, each user 162 authorized to access the performance server 120 may have a user-specific memory space assigned on the performance server 120. A user 162 may use the user-specific memory space to store files related to performance checks run by the user. For example, the user-specific memory space assigned to the user 162 may store a user-specific directory 124 that the user 162 may use to store files related to performance checks run by the user.

After logging into the performance server 120, wrapper script 144 copies the input files 126 from the jump server 140 to the user-specific directory 124 on the performance server 120, wherein the user-specific directory 124 belongs to the user 162 that requested the performance check. Additionally, wrapper script 144 may copy a performance script 122 (shown as performance script copy 128) from a shared location on the performance server 120 to the user-specific directory 124. The performance script 122 is a software program that runs one or more performance check commands or procedures in relation to the one or more RUs 106 and/or DUs 108 identified in the input files 126. Each performance check command or procedure may check one or more performance parameters related to an RU 106 and/or DU 108. The performance script 122 stored at the shared location on the performance server 120 may be a master copy of the performance script 122 that can be updated by authorized users only. Updates can be made to the master copy of the performance script 122 only by users authorized to update the performance script 122. Every time a user 162 requests to run a performance check in relation to one or more RUs 106 and/or DUs 108, the wrapper script 144 copies the master copy of the performance script 122 (e.g., a read-only copy) into a user-specific directory 124 and executes the performance script copy 128 to perform the requested performance check. This helps ensure that a most recent and updated version of the performance script 122 is used for every performance check.

After the input files 126 and the performance script copy 128 have been copied to the user-specific directory 124 on the performance server 120, wrapper script 144 initiates execution of the performance script copy 128 at the performance server 120. The execution of the performance script copy 128 causes the performance server 120 to run a set of performance check procedures on the one or more RUs and/or one or more DUs identified in the input files 126. For example, the performance script copy 128 may read identities of the one or more RUs 106 and/or one or more DUs 108 from the input files 126 and may run the performance check procedures on the identified one or more RUs 106 and/or one or more DUs 108. Additionally, the performance script copy 128 may read one or more performance parameter options selected by the user 162 from one or more input files (e.g., as shown in FIG. 2B) and may run performance check procedures corresponding to the selected performance parameter options to check the selected performance parameters in relation to the one or more RUs 106 and/or the one or more DUs 108. Performance script copy 128 may cause the performance server 120 to generate an output log file 130 that includes results of running the set of performance check procedures on the one or more RUs 106 and/or the one or more DUs 108. The performance script copy 128 may then cause the performance server 120 to store the generated output log file 130 in the user-specific directory 124 of the requesting user 162.

Once the execution of the performance script copy 128 is completed by the performance server 120 and the output log file 130 has been generated and stored in the user-specific directory 124, the wrapper script 144 running at the jump server 140 takes over and copies the output log file 130 to the jump server 140. After copying the output log file 130 to the jump server 140, the wrapper script 144 deletes the input files 126, performance script copy 128 and output log file 130 from the user-specific directory 124. As several users 162 may run performance checks and may store files related to the performance checks in respective user-specific directories of the users on the performance server 120, continuing to store files related to running performance checks after the performance checks are completed may unnecessarily occupy memory at the performance server 120. Deleting files related to the performance check after the performance check is completed, clears up memory space at the performance server 120. Additionally, as described above, when a performance check is requested by a user 162, the wrapper script 144 copies the most recent version of the performance script 122 from the shared location at the performance server 120 to the user-specific directory. Thus, there is no need to store a previous version of the performance script (e.g., performance script copy 128) after the requested performance check has been completed.

Once the output log file 130 has been copied to the jump server 140, the user 162 may copy the output log file 130 from the jump server 140 to the user device 160 of the user 162. Thereafter, the user 162 may delete the input files 126 and wrapper script 144 from the jump server 140. This helps clean up memory space on the jump server 140 for use by other operations performed by the jump server 140. In one embodiment, after the output log file 130 has been copied to the jump server 140, the jump server 140 may transmit the output log file 130 to the user device 160 and then delete the output log file 130 and the input files from the jump server 140 to clear up memory space at the jump server.

In one embodiment, the output log file 130 may be generated in a comma-separated values (CSV) file format.

In one or more embodiments, a separate wrapper script 144 and performance script 122 may be used for running performance checks on RUs 106 and DUs 108. For example, a first wrapper script and a first performance script may be configured to run performance checks on RUs, and a second wrapper script and a second performance script may be configured to run performance checks DUs. In this context, the performance server 120 may store a master copy of the first performance script and a master copy of the second performance script. In one embodiment, the jump server 140 may be configured to initiate execution of the first wrapper script when the jump server 140 receives a command from a user 162 to run a performance check on one or more RUs and may be configured to initiate execution of the second wrapper script when the jump server 140 receives a command from the user 162 to run a performance check on one or more DUs. Additionally, the first wrapper script may be configured to run the first performance script at the performance server 120 and the second wrapper script may be configured to run the second performance script and the performance server 120. In an additional embodiment, performance checks may be run simultaneously on one or more RUs and one or more DUs. For example, the performance server 120 may simultaneously run the first performance script and the second performance script.

Figure 3:
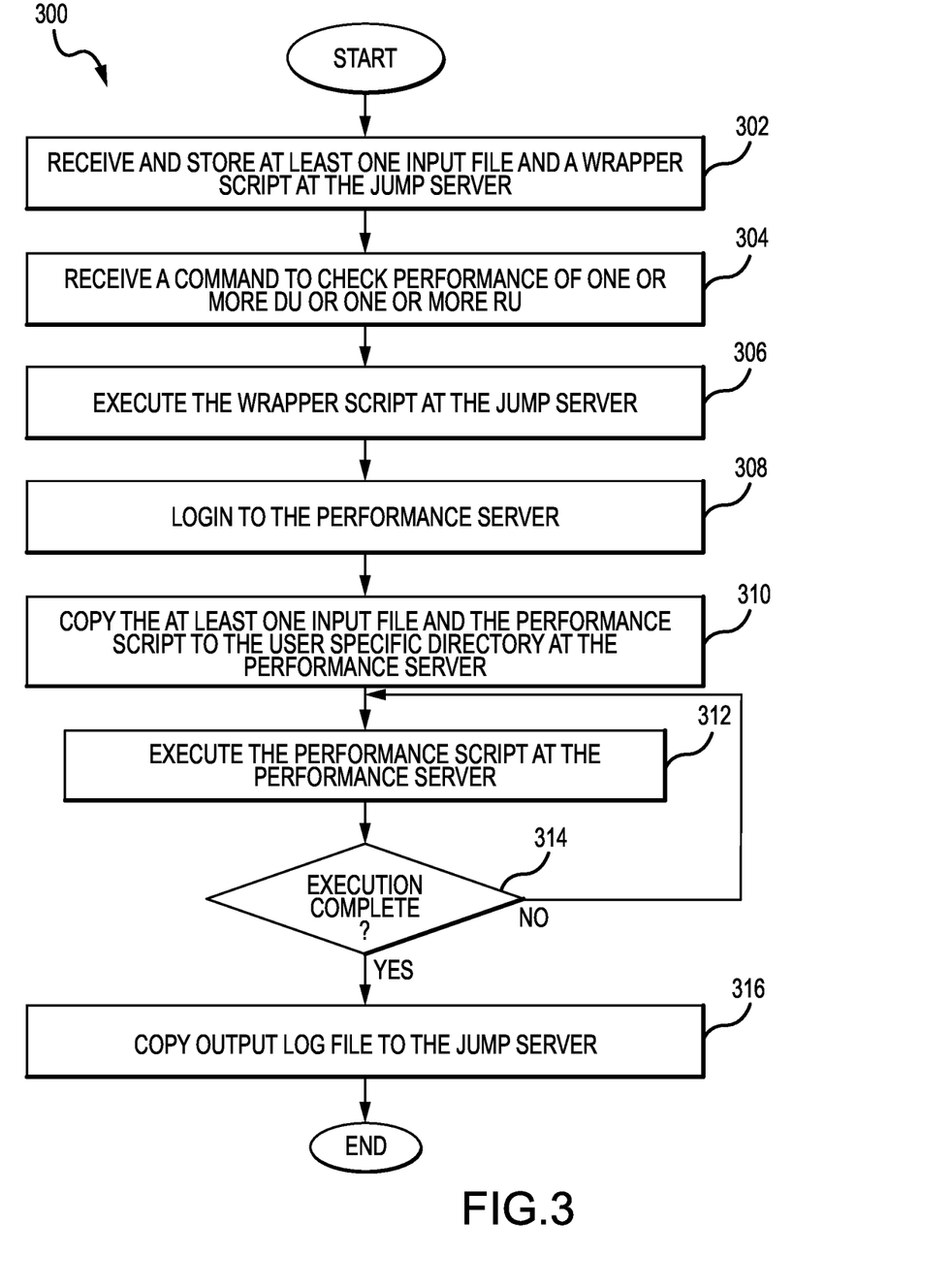
FIG. 3 is a flowchart of an example method for running performance checks on one or more RUs and/or one or more DUs, in accordance with embodiments of the present disclosure.

FIG. 3 is a flowchart of an example method 300 for running performance checks on one or more RUs and/or one or more DUs, in accordance with embodiments of the present disclosure. Method 300 may be performed by the jump server 140 and the performance server 120 as shown in FIG. 1 and described above.

At operation 302, the jump server 140 receives at least one input file 126 and a wrapper script 144 and stores the received at least one input file 126 and the wrapper script 144 in a memory of the jump server 140.

As described above, a user 162 desiring to check performance of one or more RUs 106 and/or one or more DUs 108 may provide one or more input files 126 to specify which RUs 106 and/or DUs 108 are to be checked for performance and what performance parameters are to be checked in relation to those RUs 106 and DUs 108. For example, when the user 162 desires to check performance of one or more RUs 106, an input file 126 may specify an identity of each RU 106 that is to be checked and, for each RU 106, an identity of the cell site 102 where the RU 106 is installed.

A wrapper script 144 may be provided to run performance checks on requested RUs 106 and/or DUs 108. The wrapper script 144 is a software program that automatically performs a number of tasks further described below to perform performance checks on RUs 106 and/or DUs 108 identified in the input files 126. The wrapper script 144 and input files 126 may initially be stored at a user device 160 of the user 162 desiring to run performance checks on one or more RUs and/or DUs. For example, the user 162 may generate the input files 126 (e.g., as shown in FIGS. 2A and 2C) using user device 160 by entering information identifying the RUs 106 and/or DUs 108 the user 162 desires to check for performance. The user 162 may also generate using the user device 160 one or more input files 126 (e.g., as shown in FIG. 2B) specifying one or more performance parameters that are to be checked in relation to one or more RUs and/or DUs. In one embodiment, once generated, the user 162 may upload the input files 126 to a cloud service 150. Additionally or alternatively, the wrapper script 144 may also be stored at the cloud service 150. In this context, when the user 162 is ready to run performance check on one or more RUs and/or DUs, the user 162 may download the input files 126 and the wrapper script 144 from the cloud service 150 on to the user device 160 of the user 162.

At operation 304, jump server 140 receives a command to check performance of one or more DUs 108 or one or more RUs 106.

At operation 306, in response to receiving the command to check performance of the one or more DUs 108 or one or more RUs 106, jump server 140 executes the wrapper script 144.

As described above, as part of running performance checks on RUs and/or DUs, the user 162 may first login to the jump server 140. As described above, the jump server 140 may act as a portal that provides users 162 access to all other systems and services of an organization's computing infrastructure. In one embodiment, the user 162 may need authentication credentials to login to the jump server 140. For example, the jump server 140 may require multi-factor authentication for logins to the jump server 140. Once logged into the jump server 140, the user 162 may copy the input files 126 and the wrapper script 144 to the jump server 140. Once the input files 126 and wrapper script 144 are stored at the jump server 140, the jump server 140 may be configured to initiate the performance check of RUs and/or DUs identified in the input files 126 by executing the wrapper script 144. In one embodiment, after the input files 126 and wrapper script 144 are stored at the jump server 140, the jump server 140 may receive a command (e.g., from the user 162) to perform performance check in relation to one or more RUs and/or one or more DUs identified in the input files. The jump server 140 may execute the wrapper script 144 in response to receiving the command.

At operation 308, the jump server 140 logs into the performance server 120 using user credentials of the user 162 requesting the performance check.

As described above, execution of the wrapper script 144 may cause the jump server 140 to perform a number of tasks in relation to checking performance of the RUs and/or DUs identified in the input files 126. The wrapper script 144 causes the jump server 140 to log into the performance server 120. As described above, performance server 120 may be configured to check and determine performance of entities in the 5G infrastructure including RUs 106 and DUs 108. In one embodiment, the wrapper script 144 may use authentication credentials of the user 162 requesting the performance check to login to the performance server 120. For example, only certain users 162 of the organization may be authorized to access the performance server 120 and run performance routines on the RUs 106 and/or DUs 108. The wrapper script 144 may check user authorization of the user 162 requesting the performance check and login to the performance server 120 if the user is authorized to run the requested performance check.

At operation 310, the jump server 140 copies the at least one input file 126 and a performance script 122 to a user-specific directory 124 of the user 162 stored on the performance server 120.

As described above, each user 162 authorized to access the performance server 120 may have a user-specific memory space assigned on the performance server 120. A user 162 may use the user-specific memory space to store files related to performance checks run by the user. For example, the user-specific memory space assigned to the user 162 may store a user-specific directory 124 that the user 162 may use to store files related to performance checks run by the user.

After logging into the performance server 120, wrapper script 144 copies the input files 126 from the jump server 140 to the user-specific directory 124 on the performance server 120, wherein the user-specific directory 124 belongs to the user 162 that requested the performance check. Additionally, wrapper script 144 may copy a performance script 122 (shown as performance script copy 128) from a shared location on the performance server 120 to the user-specific directory 124. The performance script 122 is a software program that runs one or more performance check commands or procedures in relation to the one or more RUs 106 and/or DUs 108 identified in the input files 126. Each performance check command or procedure may check one or more performance parameters related to an RU 106 and/or DU 108. The performance script 122 stored at the shared location on the performance server 120 may be a master copy of the performance script 122 that can be updated by authorized users only. Updates can be made to the master copy of the performance script 122 only by users authorized to update the performance script 122. Every time a user 162 requests to run a performance check in relation to one or more RUs 106 and/or DUs 108, the wrapper script 144 copies the master copy of the performance script 122 (e.g., a read-only copy) into a user-specific directory 124 and executes the performance script copy 128 to perform the requested performance check. This helps ensure that a most recent and updated version of the performance script 122 is used for every performance check.

At operation 312, the jump server 140 initiates execution of the performance script (e.g., performance script copy 128) from the user-specific directory 124.

As described above, after the input files 126 and the performance script copy 128 have been copied to the user-specific directory 124 on the performance server 120, wrapper script 144 initiates execution of the performance script copy 128 at the performance server 120. The execution of the performance script copy 128 causes the performance server 120 to run a set of performance check procedures on the one or more RUs and/or one or more DUs identified in the input files 126. For example, the performance script copy 128 may read identities of the one or more RUs 106 and/or one or more DUs 108 from the input files 126 and may run the performance check procedures on the identified one or more RUs 106 and/or one or more DUs 108.

Additionally, the performance script copy 128 may read one or more performance parameter options selected by the user 162 from one or more input files (e.g., as shown in FIG. 2B) and may run performance check procedures corresponding to the selected performance parameter options to check the selected performance parameters in relation to the one or more RUs 106 and/or the one or more DUs 108. Performance script copy 128 may cause the performance server 120 to generate an output log file 130 that includes results of running the set of performance check procedures on the one or more RUs 106 and/or the one or more DUs 108. The performance script copy 128 may then cause the performance server 120 to store the generated output log file 130 in the user-specific directory 124 of the requesting user 162.

At operation 314, the jump server 140 checks whether the execution of the performance script (e.g., performance script copy 128) is completed by the performance server 120. In response to detecting that the execution of the performance script is completed, jump server 140 copies the output log file 130 from the user-specific directory 124 to the memory of the jump server 140 and deletes the at least one input file 126, the performance script copy 128 and the output log file 130 from the user-specific directory 124. In response to detecting that the execution of the performance script is not completed, execution returns to operation 312 where the performance server continues execution of the performance script.

As described above, once the execution of the performance script copy 128 is completed by the performance server 120 and the output log file 130 has been generated and stored in the user-specific directory 124, the wrapper script 144 running at the jump server 140 takes over and copies the output log file 130 to the jump server 140. After copying the output log file 130 to the jump server 140, the wrapper script 144 deletes the input files 126, performance script copy 128 and output log file 130 from the user-specific directory 124. As several users 162 may run performance checks and may store files related to the performance checks in respective user-specific directories of the users on the performance server 120, continuing to store files related to running performance checks after the performance checks are completed may unnecessarily occupy memory at the performance server 120. Deleting files related to the performance check after the performance check is completed, clears up memory space at the performance server 120. Additionally, as described above, when a performance check is requested by a user 162, the wrapper script 144 copies the most recent version of the performance script 122 from the shared location at the performance server 120 to the user-specific directory. Thus, there is no need to store a previous version of the performance script (e.g., performance script copy 128) after the requested performance check has been completed.

Once the output log file 130 has been copied to the jump server 140, the user 162 may copy the output log file 130 from the jump server 140 to the user device 160 of the user 162. Thereafter, the user 162 may delete the input files 126 and wrapper script 144 from the jump server 140. This helps clean up memory space on the jump server 140 for use by other operations performed by the jump server 140.

Figure 4:
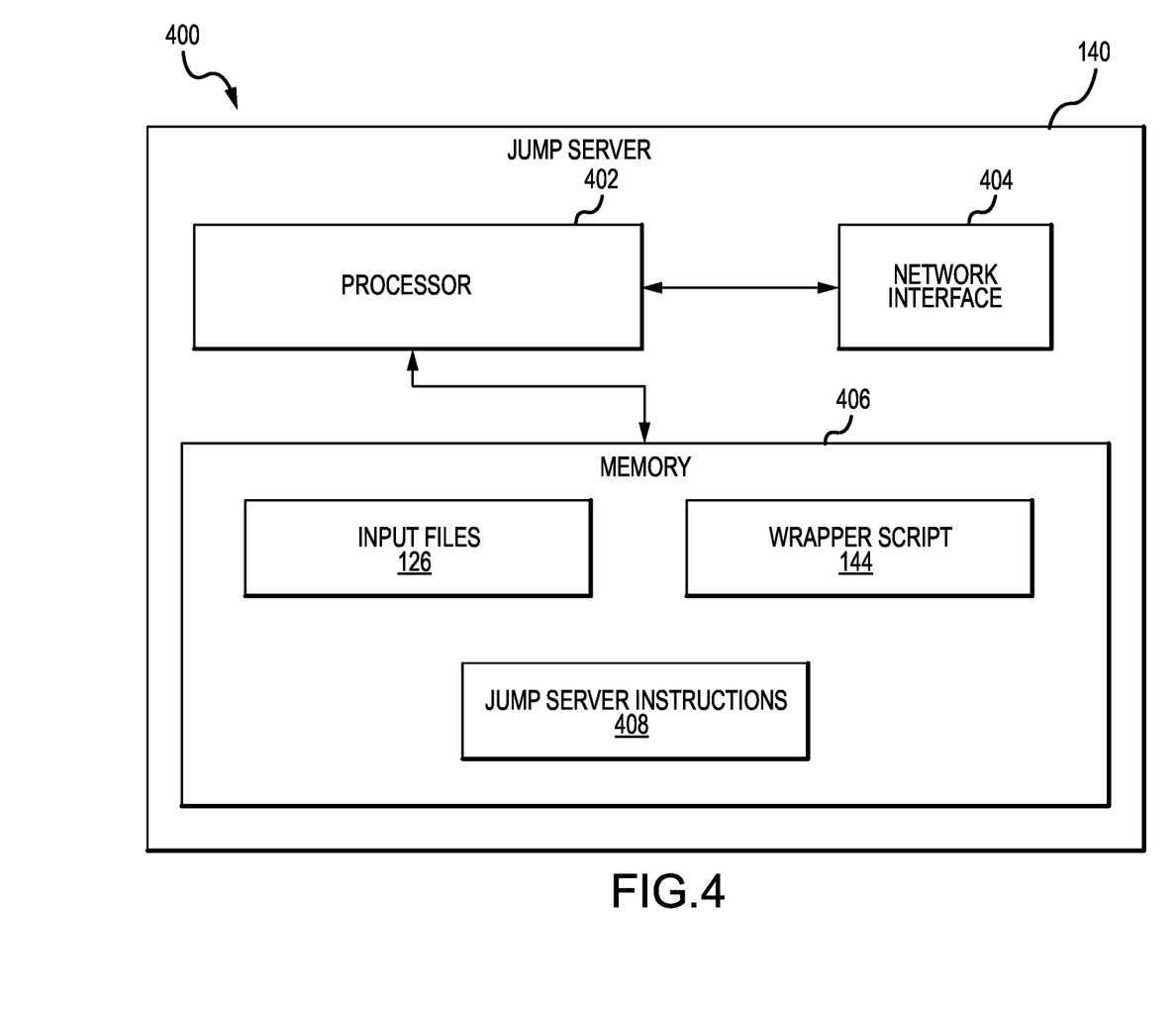
FIG. 4 illustrates an example schematic diagram of the jump server illustrated in FIG. 1, in accordance with one or more embodiments of the present disclosure.

FIG. 4 illustrates an example schematic diagram of the jump server 140 illustrated in FIG. 1, in accordance with one or more embodiments of the present disclosure.

Jump server 140 includes a processor 402, a memory 406, and a network interface 404. The jump server 140 may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., jump server instructions 408) to implement the jump server 140. In this way, processor 402 may be a special-purpose computer designed to implement the functions disclosed herein. In one or more embodiments, the jump server 140 is implemented using logic units, FPGAs, ASICs, DSPs, or any other suitable hardware. The jump server 140 is configured to operate as described with reference to FIGS. 1-3. For example, the processor 402 may be configured to perform at least a portion of the method 300 as described in FIG. 3.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store input files 126, wrapper script 144 and jump server instructions 408. The jump server instructions 408 may include any suitable set of instructions, logic, rules, or code operable to execute the jump server 140. In one embodiment the jump server instructions 408 include the wrapper script 144.

The network interface 404 is configured to enable wired and/or wireless communications. The network interface 404 is configured to communicate data between the jump server 140 and other devices, systems, or domains (e.g. performance server 120, user devices 160, cell sites 102 etc.). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

Figure 5:
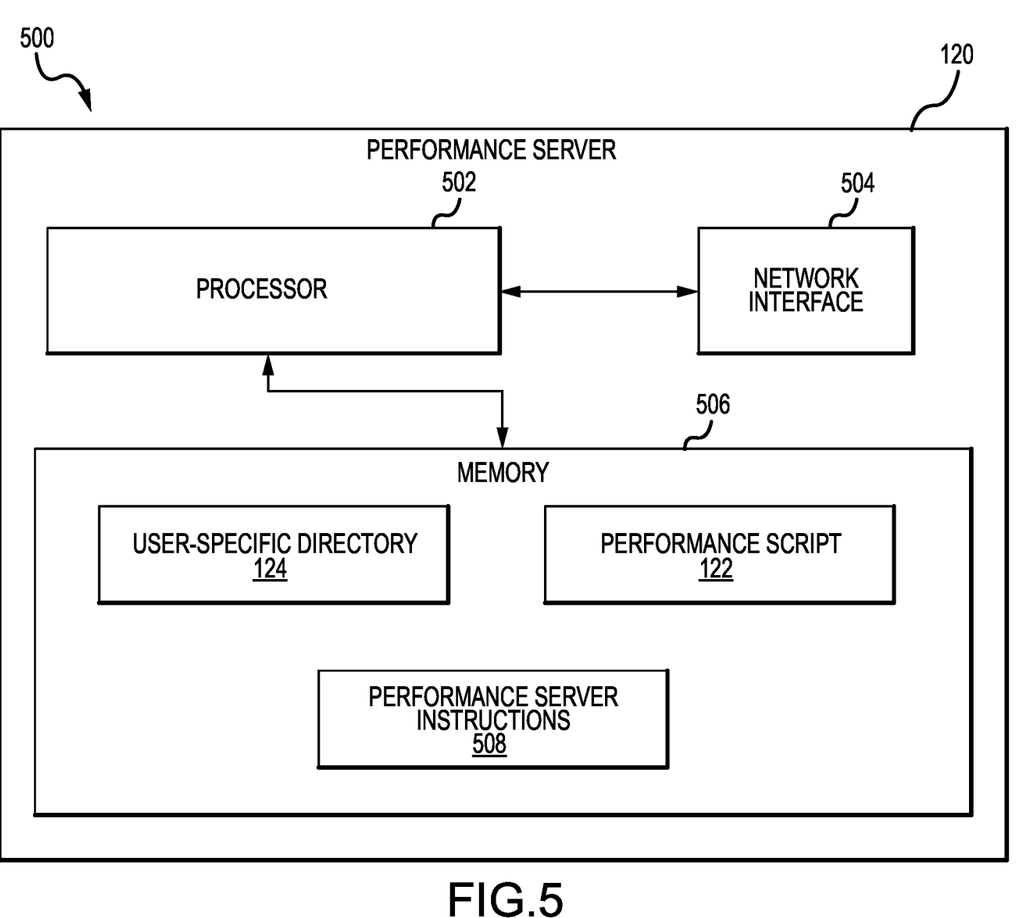
FIG. 5 illustrates an example schematic diagram of the performance server illustrated in FIG. 1, in accordance with one or more embodiments of the present disclosure

FIG. 5 illustrates an example schematic diagram of the performance server 120 illustrated in FIG. 1, in accordance with one or more embodiments of the present disclosure.

Performance server 120 includes a processor 502, a memory 506, and a network interface 504. The performance server 120 may be configured as shown in FIG. 5 or in any other suitable configuration.

The processor 502 comprises one or more processors operably coupled to the memory 506. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 506. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., performance server instructions 508) to implement the performance server 120. In this way, processor 502 may be a special-purpose computer designed to implement the functions disclosed herein. In one or more embodiments, the performance server 120 is implemented using logic units, FPGAs, ASICs, DSPs, or any other suitable hardware. The performance server 120 is configured to operate as described with reference to FIGS. 1-3. For example, the processor 502 may be configured to perform at least a portion of the method 300 as described in FIG. 3.

The memory 506 comprises one or more disks, tape drives, or solid-state drives, and may be used as an over-flow data storage device, to store programs when such programs are selected for execution, and to store instructions and data that are read during program execution. The memory 506 may be volatile or non-volatile and may comprise a read-only memory (ROM), random-access memory (RAM), ternary content-addressable memory (TCAM), dynamic random-access memory (DRAM), and static random-access memory (SRAM).

The memory 506 is operable to store user-specific directory 124, performance script 122 and performance server instructions 508. The performance server instructions 508 may include any suitable set of instructions, logic, rules, or code operable to execute the jump server 140. In one embodiment the performance server instructions 508 include the performance script 122.

The network interface 504 is configured to enable wired and/or wireless communications. The network interface 504 is configured to communicate data between the performance server 120 and other devices, systems, or domains (e.g. jump server 140, user devices 160, cell sites 102 etc.). For example, the network interface 504 may comprise a Wi-Fi interface, a LAN interface, a WAN interface, a modem, a switch, or a router. The processor 502 is configured to send and receive data using the network interface 504. The network interface 504 may be configured to use any suitable type of communication protocol as would be appreciated by one of ordinary skill in the art.

It may be noted that each user device 160, may be implemented similar to the jump server 140 or the performance server 120. For example, a user device 160 may include a processor and a memory storing instructions to implement the respective functionality of the user device 160 when executed by the processor.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a plurality of cell sites, wherein each of the cell sites includes at least one Distributed Unit (DU) and a plurality of Radio Units (RUs) communicatively coupled to the at least one DU;
a performance server comprising a first processor and communicatively coupled to the plurality of cell sites, wherein the performance server can communicate with the plurality of cell sites to check performance of one or more DUs and one or more RUs; and
a jump server communicatively coupled to the performance server, wherein the jump server comprises a second processor configured to:
receive at least one input file and a wrapper script, wherein the at least one input file comprises information relating to one or more DUs or the one or more RUs, wherein the wrapper script performs a plurality of tasks relating to checking performance of one or more DUs or the one or more RUs;
store the received at least one input file and the wrapper script in a memory of the jump server;
receive a command to check performance of the one or more DUs or the one or more RUs;
in response to receiving the command, execute the wrapper script causing the second processor to:
login to the performance server using user credentials of a user;
copy the at least one input file from the memory of the jump server into a user specific directory of the user stored at the performance server;
copy a performance script from a shared memory location within the performance server to the user specific directory, wherein the performance script is used for checking performance of the one or more DUs or the one or more RUs;
initiate execution of the performance script from the user specific directory by the first processor of the performance server causing the first processor to:
run a set of performance checking procedures on the one or more DUs or the one or more RUs identified in the at least one input file stored in the user specific directory, wherein each performance checking procedure checks at least one performance parameter related to the one or more DUs or the one or more RUs;
generate an output log file that comprises results of running the set of performance procedures; and
store the output log file in the user specific directory.

2. The system of claim 1, wherein the second processor is configured to execute the wrapper script to:
receive an indication that the execution of the performance script has been completed;
copy the output log file from the user specific directory to the memory of the jump server; and
delete the at least one input file, the performance script and the output log file from the user specific directory.

3. The system of claim 1, wherein the second processor is configured to execute the wrapper script to:
transmit the output log file from the memory of the jump server; and
after transmitting the output log file, delete the output log file, the at least one input file and the wrapper script from the memory.

4. The system of claim 1, wherein:
the performance script comprises a first performance script that checks performance of the one or more DUs;
the wrapper script comprises a first wrapper script that initiates execution of the first performance script;
the command comprises a first command to check performance of the one or more DUs; and
the second processor is further configured to:
in response to receiving the command, execute the first wrapper script to initiate execution by the second processor of the first performance script.

5. The system of claim 4, wherein:
the performance script comprises a second performance script that checks performance of the one or more RUs;
the second performance script is different from the first performance script;
the wrapper script comprises a second wrapper script that initiates execution of the second performance script;
the command comprises a second command to check performance of the one or more RUs; and
the second processor is further configured to:

in response to receiving the command, execute the second wrapper script to initiate execution by the second processor of the second performance script.

6. The system of claim 5, wherein:
the at least one input file comprises a first input file with a plurality of selectable options for checking performance of the one or more RUs;
each of the options corresponds to checking a different performance parameter associated with the one or more RUs;
one or more of the options are selected in the first input file; and
the second performance script causes the first processor to run performance procedures corresponding to the selected one or more options.

7. The system of claim 1, wherein the performance script further causes the second processor to run the set of performance procedures simultaneously on two or more RUs or two or more DUs identified in the at least one input file.

8. The system of claim 1, wherein the performance script further causes the second processor to ignore in the at least one input file a duplicate entry identifying a same DU or a same RU.

9. The system of claim 1, wherein the output file is in a comma-separated values (CSV) file format.

10. The system of claim 1, wherein the performance script stored at the shared memory location of the performance server is a master copy of the performance script configured to be modified by authorized users.

11. A method for checking performance of a cell site, comprising:
receiving at least one input file and a wrapper script at a jump server, wherein the at least one input file comprises information relating to one or more Distributed Units (DUs) or one or more Radio Units (RUs) at one or more cell sites, wherein the wrapper script performs a plurality of tasks relating to checking performance of the one or more DUs and the one or more RUs;
storing the received at least one input file and the wrapper script in a memory of the jump server;
receiving a command to check performance of the one or more DUs or the one or more RUs;
in response to receiving the command, executing the wrapper script at the jump server to:
login to a performance server using user credentials of a user;
copy the at least one input file from the memory of the jump server into a user specific directory of the user stored at the performance server;
copy a performance script from a shared memory location within the performance server to the user specific directory, wherein the performance script is used for checking performance of the one or more DUs or the one or more RUs;
initiate execution at the performance server of the performance script from the user specific directory to:
run a set of performance checking procedures on the one or more DUs or the one or more RUs identified in the at least one input file stored in the user specific directory, wherein each performance checking procedure checks at least one performance parameter related to the one or more DUs or the one or more RUs;
generate an output log file that comprises results of running the set of performance procedures; and
store the output log file in the user specific directory.

12. The method of claim 11, further comprising:
receiving an indication that the execution of the performance script has been completed;
copying the output log file from the user specific directory to the memory of the jump server; and
deleting the at least one input file, the performance script and the output log file from the user specific directory.

13. The method of claim 11, further comprising:
transmitting the output log file from the memory of the jump server; and
after transmitting the output log file, deleting the output log file, the at least one input file and the wrapper script from the memory.

14. The method of claim 11, wherein:
the performance script comprises a first performance script that checks performance of the one or more DUs;
the wrapper script comprises a first wrapper script that initiates execution of the first performance script;
the command comprises a first command to check performance of the one or more DUs; and
further comprising:
in response to receiving the command, executing the first wrapper script at the jump server to initiate execution of the first performance script at the performance server.

15. The method of claim 14, wherein:
the performance script comprises a second performance script that checks performance of the one or more RUs;
the second performance script is different from the first performance script;
the wrapper script comprises a second wrapper script that initiates execution of the second performance script;
the command comprises a second command to check performance of the one or more RUs; and
further comprising:
in response to receiving the command, executing the second wrapper script at the jump server to initiate execution of the second performance script at the performance server.

16. The method of claim 15, wherein:
the at least one input file comprises a first input file with a plurality of selectable options for checking performance of the one or more RUs;
each of the options corresponds to checking a different performance parameter associated with the one or more RUs;
one or more of the options are selected in the first input file; and
the second performance script causes the performance server to run performance procedures corresponding to the selected one or more options.

17. The method of claim 11, further comprising:
running the set of performance procedures simultaneously on two or more RUs or two or more DUs identified in the at least one input file.

18. The method of claim 11, further comprising ignoring in the at least one input file a duplicate entry identifying a same DU or a same RU.

19. A non-transitory computer-readable medium for checking performance of a cell site, the computer-readable medium storing instructions which when executed by a processor causes the processor to: receive at least one input file and a wrapper script at a jump server, wherein the at least one input file comprises information relating to one or more Distributed Units (DUs) or one or more Radio Units (RUs) at one or more cell sites, wherein the wrapper script performs a plurality of tasks relating to checking performance of the one or more DUs and the one or more RUs; store the received at least one input file and the wrapper script in a memory of the jump server; receive a command to check performance of the one or more DUs or the one or more RUs; in response to receiving the command, execute the wrapper script at the jump server to: login to a performance server using user credentials of a user; copy the at least one input file from the memory of the jump server into a user specific directory of the user stored at the performance server; copy a performance script from a shared memory location within the performance server to the user specific directory, wherein the performance script is used for checking performance of the one or more DUs or the one or more RUs; initiate execution at the performance server of the performance script from the user specific directory to: run a set of performance checking procedures on the one or more DUs or the one or more RUs identified in the at least one input file stored in the user specific directory, wherein each performance checking procedure checks at least one performance parameter related to the one or more DUs or the one or more RUs; generate an output log file that comprises results of running the set of performance procedures; and store the output log file in the user specific directory.

20. The non-transitory computer-readable medium of claim 19, wherein instructions further cause the processor to: receive an indication that the execution of the performance script has been completed; copy the output log file from the user specific directory to the memory of the jump server; and delete the at least one input file, the performance script and the output log file from the user specific directory.

* * * * *